April 21, 1931. E. W. DAVIS 1,801,414
PRESSURE REGULATING VALVE FOR LUBRICATING APPARATUS
Filed July 15, 1927
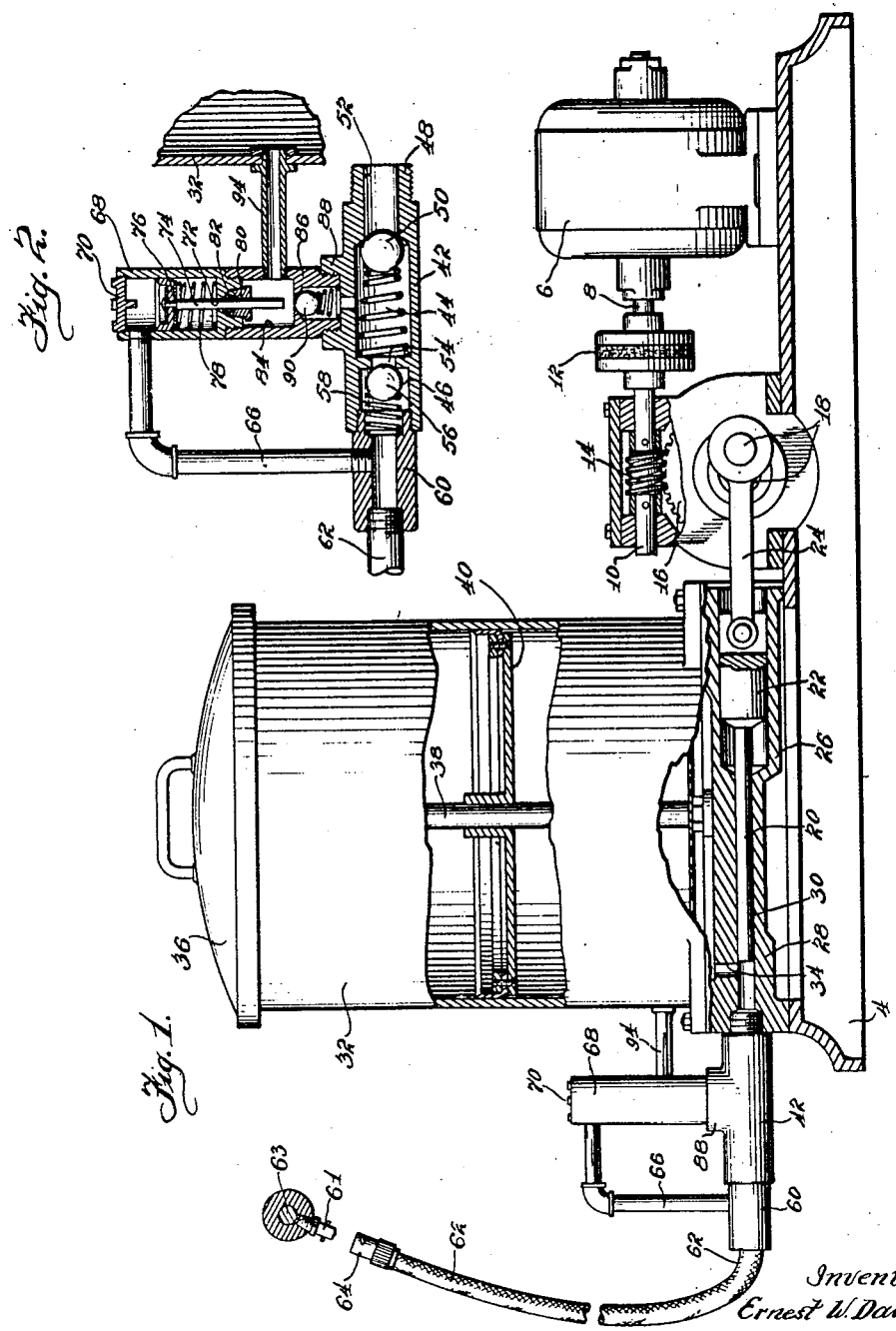
Inventor:
Ernest W. Davis
By Williams, Bradbury,
McCaleb & Hinkle
Attorneys Patented Apr. 21, 1931

1,801,414

UNITED STATES PATENT OFFICE

ERNEST W. DAVIS, OF OAK PARK, ILLINOIS, ASSIGNOR TO ALEMITE CORPORATION, OF CHICAGO, ILLINOIS, A CORPORATION OF DELAWARE

PRESSURE-REGULATING VALVE FOR LUBRICATING APPARATUS

Application filed July 15, 1927. Serial No. 205,881.

My invention relates generally to lubricating apparatus, and more particularly to devices for regulating the pressure in the discharge conduit of power operated high pressure lubricant compressors.

My invention contemplates the provision of a device for preventing the pressure in the discharge conduit from exceeding a certain predetermined maximum pressure, and opening a by-pass from the discharge conduit to the lubricant supply reservoir whenever the pressure in the discharge conduit exceeds the predetermined limit.

It is an object of my invention to provide a pressure regulating device of this type, which will reduce the power consumption of the compressor whenever lubricant is not being forced from the discharge conduit.

It is a further object of my invention to provide a device which will automatically control the lubricant compressor continuously to maintain a certain predetermined pressure on the lubricant in the discharge conduit.

A further object of my invention is to provide a device of this class, which is simple in construction, reliable, efficient and effective in operation, and which may be economically manufactured.

Other objects will appear from the following description, reference being had to the accompanying drawings, in which Fig. 1 is an elevation of a power operated lubricant compressor unit, parts of the casing being broken away to show the internal construction thereof, and Fig. 2 is an enlarged central vertical cross sectional view of the pressure regulating device of my invention.

In lubricant compressors, as used in garages and industrial plants, an electric motor or other suitable motor is frequently used to drive the pump which places the lubricant under pressure. The discharge from the pump is intermittent, that is, the lubricant discharge conduit is successively connected to each of a plurality of bearings, and during the time that the connections are being made, and also while the apparatus is being moved from one machine to another, it is inconvenient to shut off the supply of electric current to the motor. One method of operation is to permit the motor to run continuously and to provide a safety valve to permit by-passage of the lubricant from the discharge conduit to the reservoir as soon as the pressure in the discharge conduit builds up to a predetermined limit. In utilizing this method of controlling the pressure in the discharge conduit, the pump works continuously against high pressure, thereby maintaining a continuous heavy load upon the motor, with the result that the current consumption is much greater than necessary, and that the life of the motor and connecting gearing is proportionately shortened.

My invention contemplates the provision of a device which will maintain the pressure in the discharge conduit at a predetermined high pressure and yet permit the pump to work against a very low pressure after the predetermined pressure in the discharged conduit has been attained.

In Fig. 1 I have illustrated a conventional electric motor driven pumping outfit to which the pressure regulating device of my invention has been applied. The outfit is mounted as a unit upon a suitable base 4, which may be permanently secured to a suitable foundation or may be mounted upon casters. A motor 6, having a rotor shaft 8, is mounted upon this base casting, the shaft 8 being connected to a worm drive shaft 10 by any suitable flexible connection 12. A worm 14 is keyed or pinned to the shaft 12 and meshes with a worm gear 16 secured to a crank shaft 18. A pump plunger 20 having an enlarged slide portion 22 is connected to the crank shaft 18 by a suitable connecting rod 24. The portion 22 slides freely in a cylinder 26 formed in a casting 28, which is secured to the base casting 4. This casting 28 also has a plunger cylinder 30, which communicates with the inside of a container 32 through an inlet port 34. The container has a suitable cover 36, and is provided with a removable rod 38 which serves as a guide for atmospheric pressure follower 40. The rod 38 is threaded or otherwise suitably secured in the casting 28 but may be removed therefrom when the container is to be refilled, and has suitable projections at its lower end, so that the follower 40 may easily be withdrawn from the container when the latter is to be refilled.

The pressure regulating device of my invention is best illustrated in Fig. 2, and comprises a body 42 in which chambers 44 and 46 are formed. The body 42 has a threaded portion 48 screwed into the end of the cylinder 30. Its chamber 44 contains a spring pressed ball check valve 50 preventing return flow to the pump cylinder through the bore 52. Chambers 44 and 46 are connected by a duct 54, which is normally closed by a spring pressed ball check valve 56, the spring 58 of which is seated upon a suitable shoulder formed in a T connection 60, which is threaded into the end of the body 42. A discharge conduit 62 is attached to the connection 60 in a suitable manner, and at its other end carries a suitable coupler 64 by which a quick detachable connection may be made with the fittings 61 of bearings 63 which are to be lubricated. This coupler may be of any well known type comprising a valve which is opened to permit the passage of lubricant after the coupling operation has been completed, which valve closes upon detaching the coupling from the lubricant receiving fitting. In lieu of a valved coupler, a valveless coupler is often used, in which case a suitable manually controlled valve is used near the coupler to control the flow of lubricant from the conduit.

The T connection 60 is threaded to receive a pipe or other suitable conduit 66 which leads to the upper end of a cylinder 68. The upper end of the cylinder is closed by a suitable threaded plug 70, while the lower end has a small bore 72 forming a guide for a stem 74 carried by a cup leather piston 76. A spring 78 normally forces the piston upwardly. A packing gland 80 with suitable packing 82 prevents leakage of lubricant past the stem 74. The lower end of the stem 74 protrudes within a chamber 84 formed in a tubular support 86, which is threaded in a boss 88 formed at the top of the body 42, and has its upper end internally threaded to receive the lower end of the cylinder 68. The tubular support 86 has a spring pressed ball valve 90 normally preventing flow of lubricant from the chamber 44 through a port 92 into the chamber 84. The chamber 84 is connected to the container 32 by a pipe 94.

It will be understood that in the ordinary operation of the above described lubricating apparatus, the connection with the lubricant receiving fittings will be made successively by means of the coupling 64. Since the motor operates continuously, and the pump plunger is directly connected to the motor, there will be a tendency to build up an excessive pressure in the conduit 62. My improved pressure regulator overcomes this tendency and at the same time maintains the desired pressure in the discharge conduit.

During normal operation when lubricant is being discharged from the conduit 62 lubricant will flow directly past check valves 50 and 56 to the conduit and the remaining parts will be in the positions substantially as shown in Fig. 2. When the valve at the coupler 64 is closed, the pressure will quickly build up in the conduit until it reaches the predetermined maximum limit, which, for illustrative purposes, will be assumed to be 1,000 pounds per square inch. As the pressure rises, lubricant will be forced through the pipe 66 into the chamber 68, and force the piston 76 and stem 74 downwardly against the resiliency of spring 78. When the pressure of 1,000 pounds per square inch is reached, the end of the stem 74 will contact with and depress the ball valve 90, thereby permitting free passage of the lubricant from the pump cylinder past the check valve 50 through the bore 92 past the valve 90 into the chamber 84 and thence through the pipe 94 into the reservoir 32. It will be noted that the resistance to flow through this passage is very slight, being only of the amount necessary to opening check valve 50 and overcome the negligible friction of the passageways. The motor thus does very little work, with consequent reduction in the amount of electricity consumed and in the wear on the motor and driving parts. The check valve 90 will prevent return flow of lubricant in the conduit and the pressure therein will thus remain at 1,000 pounds per square inch. The stem 74 will hold the valve 90 open as long as the pressure of 1,000 pounds per square inch or more is maintained in the conduit. As soon as the pressure drops below 1,000 pounds per square inch, the spring 78 will force the piston 76 upwardly, thereby withdrawing the stem 74 from contact with the valve 90 and thus closing the by-pass. The only passage then open for escape of the lubricant from the pump cylinder will be past the check valves 50 and 56 into the discharge conduit 62.

As previously pointed out, this system and device for regulating the lubricant pressure in the discharge conduit is far superior to the customary safety valve idea, because it relieves the pressure head against which the pump operates during the time when lubricant is not being discharged. The maximum pressure maintained in the conduit is dependent upon the size of the piston 76 and its cylinder, the resiliency of the spring 78 and the size of the port of the valve 90. Either one or several of these factors may be varied to increase or decrease the maximum pressure limit. The cylinder 68 is made separable from the remaining parts of the regulator, so that if a different maximum pressure is desired, a cylinder, piston, stem, and spring having the desired characteristics may be substituted as a unit.

While I have shown and described but a single embodiment of my invention, it will be apparent to those skilled in the art that various modifications thereof may be made without departure from the principles of my invention, and that while I have described the invention as used with lubricating apparatus, to which use it is particularly adapted, the device may be used in many other ways. I therefore wish the scope of my invention to be limited only by the claims which follow.

I claim:

1. In a high pressure lubricating system having a reservoir and a continuously driven pump supplied with lubricant therefrom, the combination of a valved discharge conduit adapted intermittently to permit escape of lubricant therefrom and adapted to be connected to the outlet of the pump, two check valves in said discharge conduit, a passageway leading from the space between said check valves to said reservoir, an inwardly opening valve in said passageway, and lost motion means actuated by the pressure in said conduit beyond said check valves for opening said valve when a predetermined pressure is attained in said discharge conduit.

2. In a high pressure lubricating system having a reservoir and a continuously driven pump supplied with lubricant therefrom, the combination of a valved discharge conduit adapted intermittently to permit escape of lubricant therefrom and connected to said pump, a pair of check valves in said discharge conduit, a passage leading from the space between said check valves, an inwardly opening valve in said passage, a piston and cylinder connected to said conduit at a point beyond said check valves and a stem carried by said piston and adapted to contact with and open said last named valve when a predetermined pressure is attained in said discharge conduit.

3. In a high pressure lubricating system having a reservoir and a continuously driven pump supplied with lubricant therefrom, the combination of a discharge conduit adapted intermittently to permit escape of lubricant therefrom and connected to said pump, a pair of valves in series in said discharge conduit, a passage leading from the space between said valves to said reservoir, an inwardly opening pressure relief valve in said passage, piston means actuated by the lubricant pressure in a portion of said conduit beyond said pair of valves, and a lost motion connection between said piston means and said relief valve, said piston means and connection being adapted to open said relief valve when a predetermined pressure is attained in said portion of said discharge conduit.

4. In a high pressure lubricating system having a continuously operating motor and a pump directly connected thereto, the combination of a pair of check valves in series at the outlet of said pump, a valved discharge conduit having one end connected to the outlet of said pump, the other end thereof being adapted to be successively connected to a plurality of receiving devices, and means to prevent excess pressures in said conduit and relieving the pressure at the outlet of said pump between said check valves, comprising an inwardly opening pressure relief valve between said check valves and lost motion means responsive to the pressure in said discharge for opening said relief valve.

5. In a high pressure lubricating system having a motor driven pump and a reservoir for supply lubricant thereto, a pressure regulating device connected to the outlet of said pump, said device comprising a body having two valve seats, spring pressed outwardly opening check valves normally resting on said seats, a by-pass outlet between said check valves, an inwardly opening spring pressed closure normally closing said by-pass, a cylinder secured above said closure, a spring pressed piston reciprocable in said cylinder, a stem secured to said piston and projecting through the lower end of said cylinder into a chamber communicating with said reservoir, said stem having its end in alignment with and normally spaced a short distance above said closure, and a connection from a point beyond said outwardly opening check valves to said cylinder whereby said piston and stem will be forced downwardly to open said by-pass closure upon a predetermined pressure without materially decreasing the pressure at said point.

6. In a high pressure lubricating system having a reservoir and pumping means adapted to deliver lubricant at constant pressure connected to said reservoir, the combination of a discharge conduit connected to the outlet of said means, a pair of outwardly opening check valves in series in said outlet, a by-pass to said reservoir from said outlet at a point between said check valves, an inwardly opening closure in said by-pass, and piston and cylinder means operated by the pressure in said discharge conduit for opening said by-pass closure, said last-named means being removable as a unit from the combination.

In witness whereof, I hereunto subscribe my name this 9th day of July, 1927.

ERNEST W. DAVIS.